United States Patent [19]
Jordan

[11] 3,807,760
[45] Apr. 30, 1974

[54] RIDER-PROPELLED VEHICLE
[76] Inventor: Gerald J. Jordan, 127 W. Chicago, Marceline, Mo. 64658
[22] Filed: July 13, 1972
[21] Appl. No.: 271,551

[52] U.S. Cl.................. 280/218, 280/267, 280/282
[51] Int. Cl............................................ B62m 1/00
[58] Field of Search............ 280/218, 181, 267, 282

[56] References Cited
UNITED STATES PATENTS
| | | | |
|---|---|---|---|
| 2,539,640 | 1/1951 | Sebel | 280/218 UX |
| 2,081,750 | 5/1937 | Laborda | 280/218 |
| 1,443,153 | 1/1923 | Swinland | 280/218 |

FOREIGN PATENTS OR APPLICATIONS
| | | | |
|---|---|---|---|
| W6281 | 9/1955 | Germany | 280/218 |

*Primary Examiner*—Stanley H. Tollberg
*Assistant Examiner*—Norman L. Stack, Jr.
*Attorney, Agent, or Firm*—Koenig, Senniger, Powers and Leavitt

[57] ABSTRACT

A rider-propelled vehicle, and more particularly a children's riding vehicle, having a seat and front and rear wheels supporting the seat from the ground. The front wheels are carried by an axle mounted for swinging movement intermediate its ends relative to the seat on an upright axis, the front wheels being spaced generally at equal distances on opposite sides of said upright axis on a common generally horizontal axis. Associated with each front wheel is means permitting rotation thereof in a forward direction with respect to the vehicle but preventing rotation thereof in reverse direction with respect to the vehicle. The axle is adapted to occupy a neutral position in which the axis of the front wheels is generally at right angles to the longitudinal axis of the vehicle for rolling of the vehicle in the direction of said longitudinal axis, and is swingable on the said upright axis in opposite directions via a handlebar and/or footrests for effecting propulsion of the vehicle via one front wheel being held against reverse rotation while the other rotates in forward direction and the axle swings forward on the point of engagement of said one front wheel with the ground thereby to pull the vehicle forward.

7 Claims, 8 Drawing Figures

PATENTED APR 30 1974 3,807,760

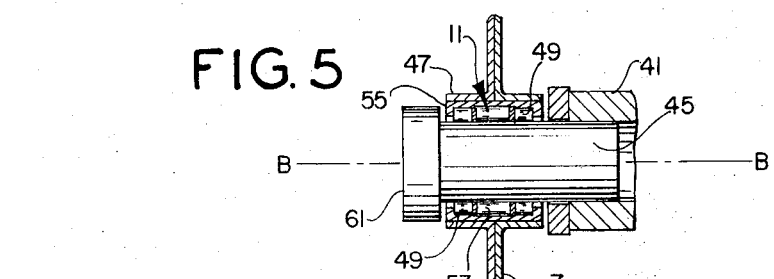
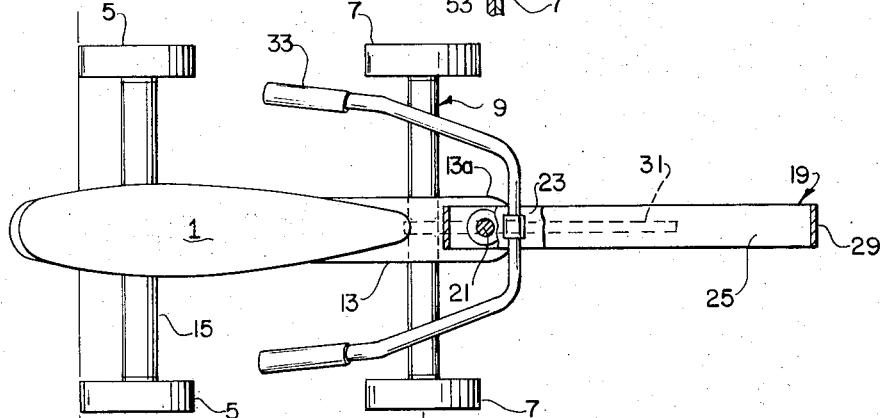
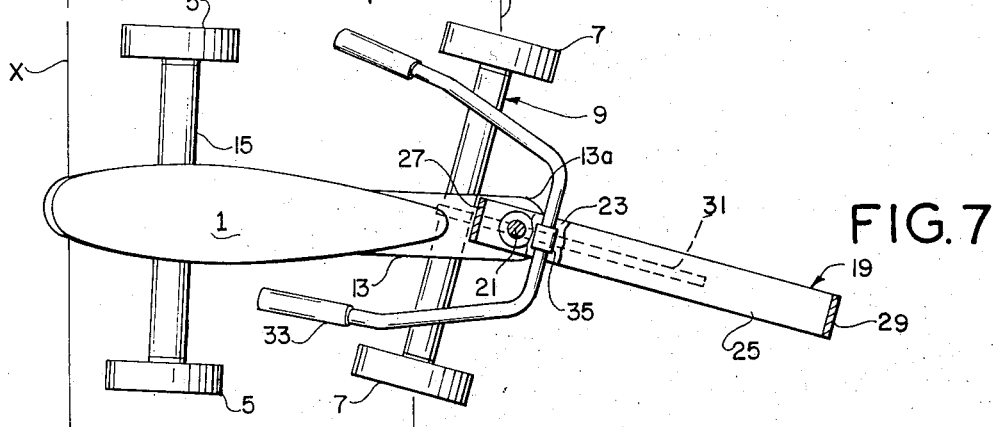
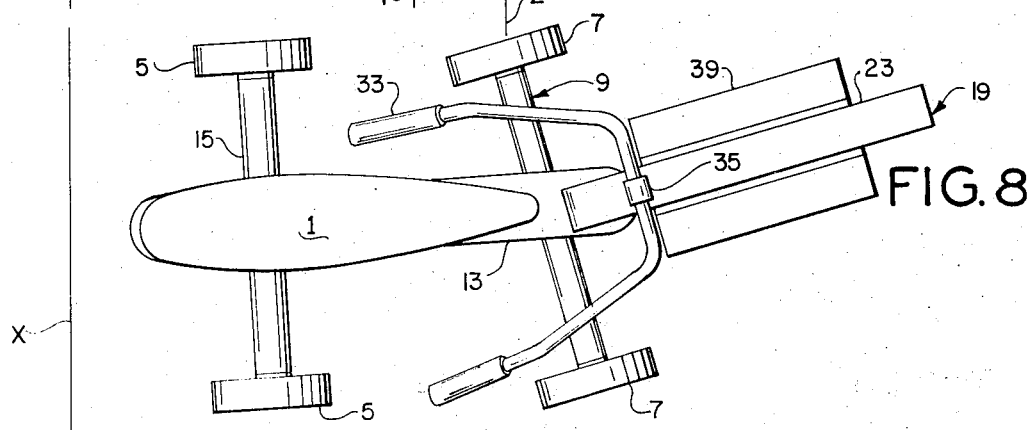

RIDER-PROPELLED VEHICLE

BACKGROUND OF THE INVENTION

This invention relates to rider-propelled vehicles, and more particularly to a children's vehicle of this class.

The invention is in the field of rider-propelled vehicles having wheel means swingable about an upright axis by the rider to effect propulsion of the vehicle.

SUMMARY OF THE INVENTION

Among the several objects of this invention may be noted the provision of a rider-propelled vehicle, operable by the rider swinging certain wheel means of the vehicle via handlebars and/or a footrest, and effecting propulsion of the vehicle with ease and without critical body movement; and the provision of such a vehicle adapted for embodiment in many styles, with wide latitude as to location and size of wheels, and location of the seat for the rider.

In general, a vehicle of this invention comprises a seat and wheel means for supporting the seat from the ground including an axle mounted for swinging movement intermediate its ends relative to the seat on an upright axis. The axle carries a pair of wheels spaced generally at equal distances on opposite sides of said upright axis with the wheels on a common generally horizontal axis. Associated with each wheel is means permitting rotation thereof in forward direction with respect to the vehicle but preventing rotation thereof in reverse direction with respect to the vehicle. The axle is adapted to occupy a neutral position in which the axis of the wheels is generally at right angles to the longitudinal axis of the vehicle for rolling of the vehicle in the direction of said longitudinal axis, and is swingable on the said upright axis in opposite directions for effecting propulsion of the vehicle via one wheel being held against reverse rotation while the other rotates in forward direction and the axle swings forward on the point of engagement of said one wheel with the ground thereby to pull the vehicle forward.

Other objects and features will be in part apparent and in part pointed out hereinafter.

BRIEF DESCRIPTION OF THE DRAWINGS

FIG. 5 is an axial section showing the bearing and anti-reverse means for one of the front wheels of the vehicle; and FIGS. 6–8 are views showing the vehicle progressing forward via swinging of its front wheels.

Corresponding reference characters indicate corresponding parts throughout the several views of the drawings.

DESCRIPTION OF THE PREFERRED EMBODIMENT

Figure 1:
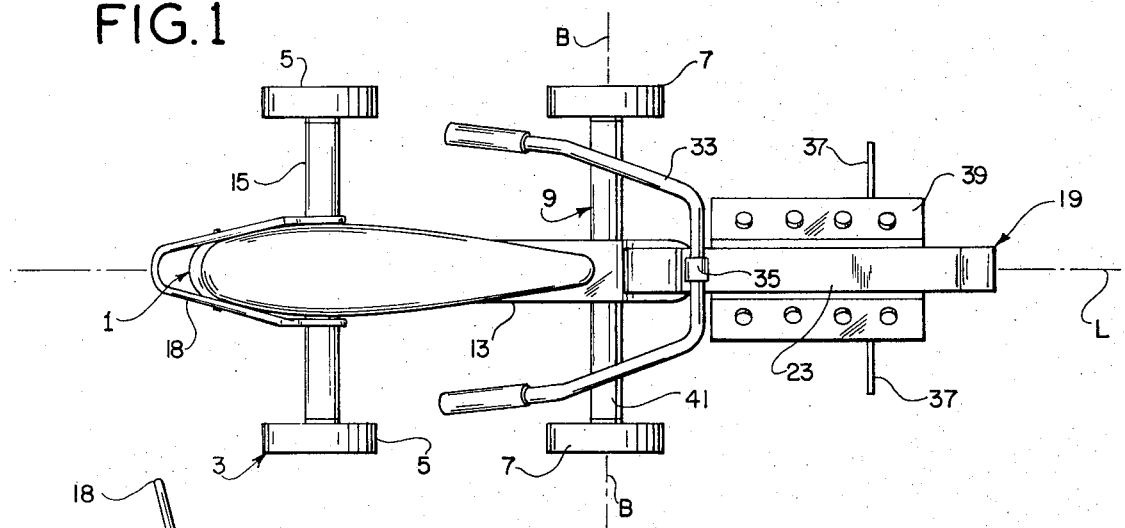
FIG. 1 is a plan of a vehicle of this invention.
Figure 2:
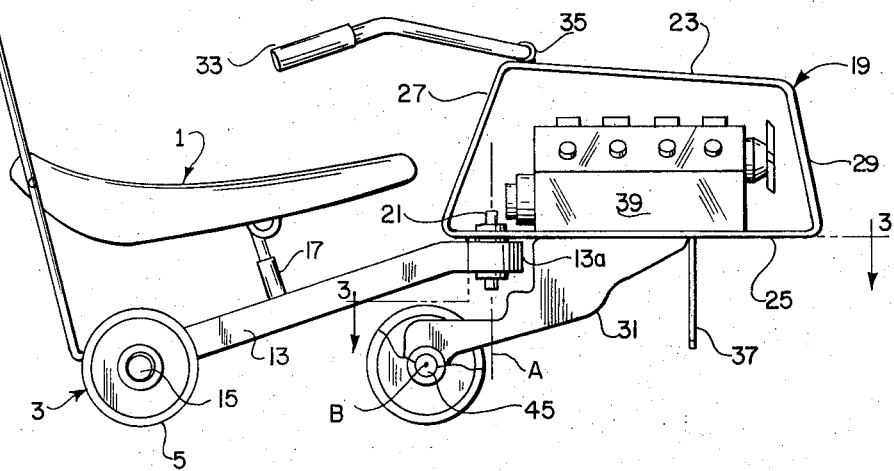
FIG. 2 is a side elevation of FIG. 1.
Figure 3:
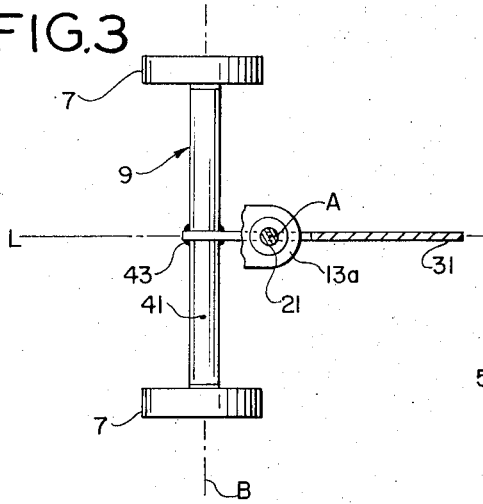
FIG. 3 is a horizontal section on line 3—3 of FIG. 2.
Figure 4:
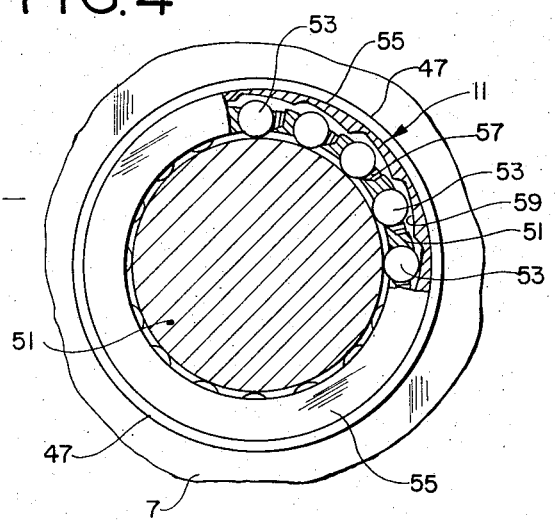
FIG. 4 is an enlarged section with parts broken away and shown further in section of an antireverse means for a front wheel of the vehicle.

Referring to the drawings, a vehicle of this invention is shown to comprise a seat 1 and wheel means generally indicated at 3 for supporting the seat from the ground. The wheel means comprises a pair of rear wheels 5 and a pair of front wheels 7 carried by an axle 9 mounted for swinging movement intermediate its ends relative to the seat on an upright axis indicated at A. The front wheels 7 are spaced at equal distances on opposite sides of axis A with these wheels on a common axis B. Associated with each of the front wheels 7 is means generally designated 11 in FIGS. 4 and 5 permitting rotation thereof in forward direction with respect to the vehicle but preventing rotation thereof in reverse direction with respect to the vehicle. Axle 9 is adapted to occupy a central or neutral position (as shown in solid lines in FIGS. 1–3 and 6) in which axis B is generally at right angles to the longitudinal axis L of the vehicle (see FIGS. 1 and 3) for rolling of the vehicle in the direction of said longitudinal axis, and is swingable on axis A in opposite directions (see FIGS. 7 and 8) for effecting propulsion of the vehicle via one front wheel 7 being held against reverse rotation while the other rotates in forward direction and the axle swings forward on the point of engagement of said one front wheel with the ground thereby to pull the vehicle forward.

More particularly, the vehicle comprises a frame 13 shown as constituted by a bar extending in the direction of the longitudinal axis L of the vehicle, this bar being inclined from its rearward end upwardly toward the front of the vehicle, and having a horizontal front end portion 13a. A rear axle 15 extends laterally outwardly on opposite sides of the bar 13 at its rearward end and carries the rear wheels 5. While the vehicle is shown as having a pair of rear wheels, it will be understood that it is within the scope of this invention to have a single rear wheel. The seat 1 is mounted on a post 17 extending up at right angles to bar 13. A back rest for the seat is indicated at 18.

An arm 19 is pivoted on axis A by means of a pivot pin 21 extending down through the horizontal front end portion 13a of the bar 13. As shown, this arm is of open trapezoidal form, having top and bottom bars 23 and 25 and rear and front bars 27 and 29. The rear end of the bottom bar 25 overlies portion 13a of bar 13, and pin 21 extends down through 25 and 13a. The arm 19 extends forward from the front end 13a of bar 13 and has a bracket 31 extending down and back therefrom under the front end of the bar 13. This bracket carries the front axle 9, the latter being non-rotatably carried by the bracket and extending laterally outwardly on opposite sides of the bracket adjacent the rear end of the bracket. As shown, the bracket extends rearward beyond the axis A and axle 9 is rearward of axis A, but this is not essential.

A handlebar 33 is secured at 35 to the top bar 23 of arm 19 adjacent the rear end of bar 23, and thus is interconnected with the front axle 9, being positioned to be manipulable by the rider of the vehicle seated on the seat 1 for swinging the arm 19 and thus the axle 9 on axis A. Foot rests 37 for the rider's feet extend laterally outwardly from the bottom bar 25 of arm 19 on opposite sides thereof. As shown, a mock engine 39 is mounted in the arm 19 on its bottom bar.

The front axle 9, as shown, comprises a length of pipe 41 welded as indicated at 43 in a hole in the bracket 31 at its rear end, with stub shafts 45 secured in the ends of the pipe and extending outwardly therefrom. Each of the front wheels 7 has a hub 47 (see FIGS. 4 and 5) mounted on the stub shaft 45 at the respective end of the axle 9 by means of an overrunning clutch and bearing assembly, the overrunning clutch of which serves as the anti-reverse means 11 for the wheel. This assembly may be one marketed by The Torrington Company, of Torrington, Conn., and such as shown in its U.S. Pat. No. 3,194,368, comprising two outer roller bearing races 49 (see FIG. 5) and, between these races, an overrunning clutch mechanism including a roller cage 51 and rollers 53, all in a cup 55 secured in the hub 47 of the wheel. The rollers lie in axial slots 57 in the cage, and the cup has ramps 59 on the inside for wedging the rollers against the shaft 51 on counterclockwise rotation of the cup about the shaft as viewed in FIG. 4. The clutch and bearing assembly is arranged so as to backstop the wheel, i.e., to lock it against reverse rotation on its stub shaft, while permitting it to rotate freely in forward direction on the stub shaft (clockwise as viewed in FIG. 4). Each stub shaft has means such as indicated at 61 in FIG. 5 at its outer end retaining the clutch and bearing assembly on the shaft.

With the anti-reverse means 11 for each of the front wheels 7, the rider is enabled to effect propulsion of the wheel in forward direction by swinging the front axle 9 back and forth via hand manipulation of the handlebar 33, or foot manipulation of the foot rests 37 (or both). As the axle 9 is swung clockwise on axis A as viewed from above (and in FIGS. 1, 3, 6 and 7), the right-hand wheel 7 tends to roll rearward, but is prevented from doing so by its anti-reverse means 11. Thus, the right-hand wheel 7 remains essentially stationary (except for pivoting on a generally vertical axis through its point of engagement with the ground). The left-hand wheel 7 is free to roll forward, and the net effect is that axis A (pivot pin 21) is pulled forward, moving in an arc centered in the vertical axis of the right-hand wheel 7, thus propelling the vehicle forward. FIGS. 6 and 7 illustrate this action, FIG. 7 showing the front wheels swung clockwise and the advance of the vehicle forward from its FIG. 6 position, with line X projected down from FIG. 6 more clearly to illustrate the advance of the vehicle, and line Y projected down to show the non-advance of the right-hand front wheel. As the axle 9 is swung counterclockwise on axis A as viewed from above (and in FIG. 8), the left-hand wheel 7 tends to roll backward, but is prevented from doing so by its anti-reverse means 11. Thus, the left-hand wheel 7 remains essentially stationary (except for pivoting on a generally vertical axis through its point of engagement with the ground). The right-hand wheel 7 is free to roll forward, and the net effect is that axis A (pivot pin 21) is pulled forward, moving in an arc centered in the vertical axis of the left-hand wheel, thus propelling the vehicle forward. FIGS. 7 and 8 illustrate this action, line 2 being projected down from FIG. 7 to FIG. 8 to show the non-advance of the left-hand front wheel. On continued oscillation of the handlebar and axle 9 about axis A, the vehicle builds up forward momentum, whereupon, by centering the handlebar and axle 9, the vehicle may be allowed to roll forward (and steered as desired) until further propulsion is needed. No critical body movement is required to effect propulsion, other than such balancing as may be needed when the handlebars are swung from side to side.

The construction is such as to permit wide latitude in the location and size of the wheels and the location of the seat, the specific locations and sizes shown simply being exemplary, and provision of arm 19 is not critical. It is possible, for example, that axle 9 may be directly at the lower end of a pivot pin extending through the front end portion 13a of bar 13, with the handlebars attached to the upper end of the pivot pin, rather than having arm 19 and bracket 31. And the invention is capable of embodiment in many other designs and styles than that shown.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rider-propelled wheeled vehicle comprising a seat and wheel means for supporting the seat from the ground including an axle mounted for swinging movement intermediate its ends relative to the seat on an upright axis, a handlebar for swinging said swingable axle about its upright axis and for steering said vehicle, a fixed axle extending generally at right angles to the longitudinal axis of said vehicle, a pair of wheels carried by said fixed axle, another pair of wheels carried by said swingable axle spaced generally at equal distances on opposite sides of said upright axis with the last-said wheels on a common generally horizontal axis, and means associated with each wheel carried by said swingable axis permitting rotation thereof in forward direction with respect to the vehicle but preventing rotation thereof in reverse direction with respect to the vehicle, said swingable axle being adapted to occupy a neutral position in which the axis of the wheels is generally at right angles to the longitudinal axis of the vehicle for rolling of the vehicle in the direction of said longitudinal axis, and said swingable axle being swingable on the said upright axis in opposite directions for effecting propulsion of the vehicle via one wheel carried by said swingable axle being held against reverse rotation while the other rotates in forward direction and the swingable axle swings forward on the point of engagement of said one wheel with the ground thereby to pull the vehicle forward.

2. A vehicle as set forth in claim 1 wherein said upright axis is toward the front end of the vehicle.

3. A vehicle as set forth in claim 2 having foot rests for the rider's feet swingable with said handlebar and swingable axle.

4. A vehicle as set forth in claim 1 having a frame carrying the seat, said wheel means further comprising at least one wheel at the rear of the frame, said vehicle having an arm pivoted on said upright axis toward the front end of the frame, said arm carrying said axle, and a handlebar secured to said arm manipulable by the rider seated on the seat for swinging the arm and axle on said upright axis.

5. A vehicle as set forth in claim 4 having foot rests for the rider's feet extending laterally outwardly from the arm on opposite sides thereof.

6. A vehicle as set forth in claim 4 wherein said arm extends forward from the frame and has a bracket extending down and back therefrom under the frame, said swingable axle extending laterally outwardly on opposite sides of the bracket adjacent the rear end of the bracket.

7. A vehicle as set forth in claim 6 wherein the swingable axle is non-rotatably carried by the bracket and the front wheels are mounted at the ends of the swingable axle for rotation relative to the last-said axle with said means preventing reverse rotation of each front wheel interposed between the wheel and the swingable axle.

* * * * *